Figure 7:
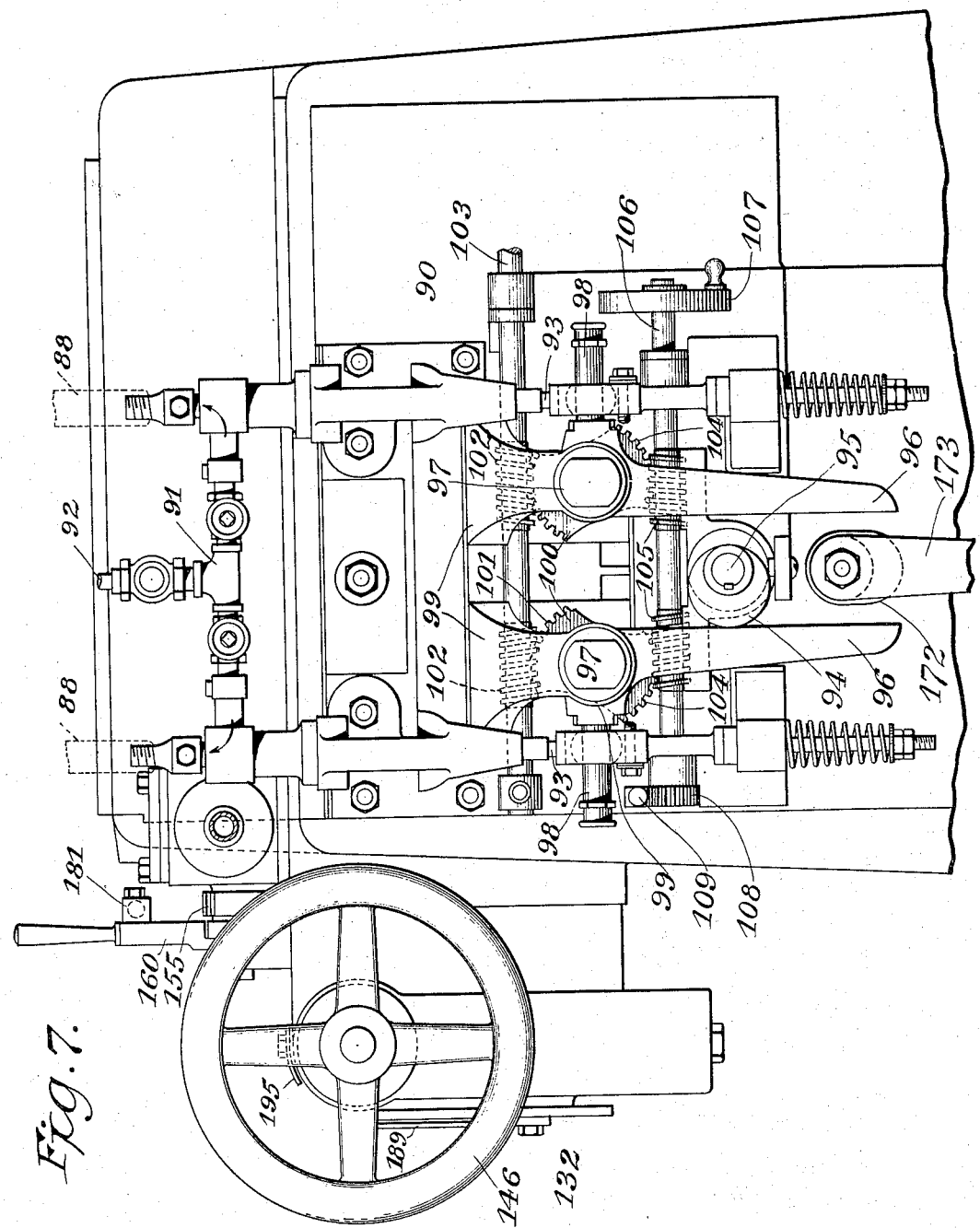

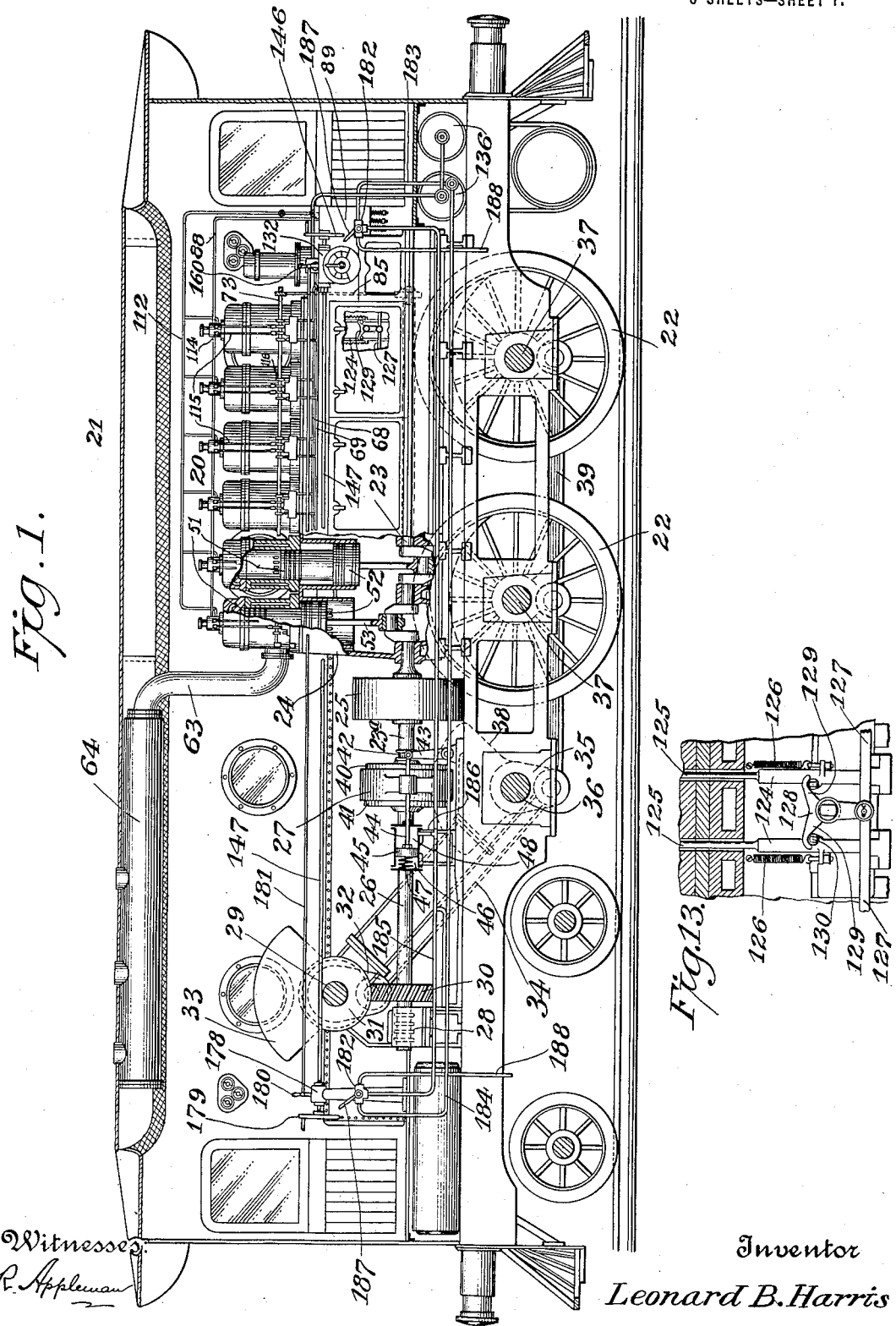

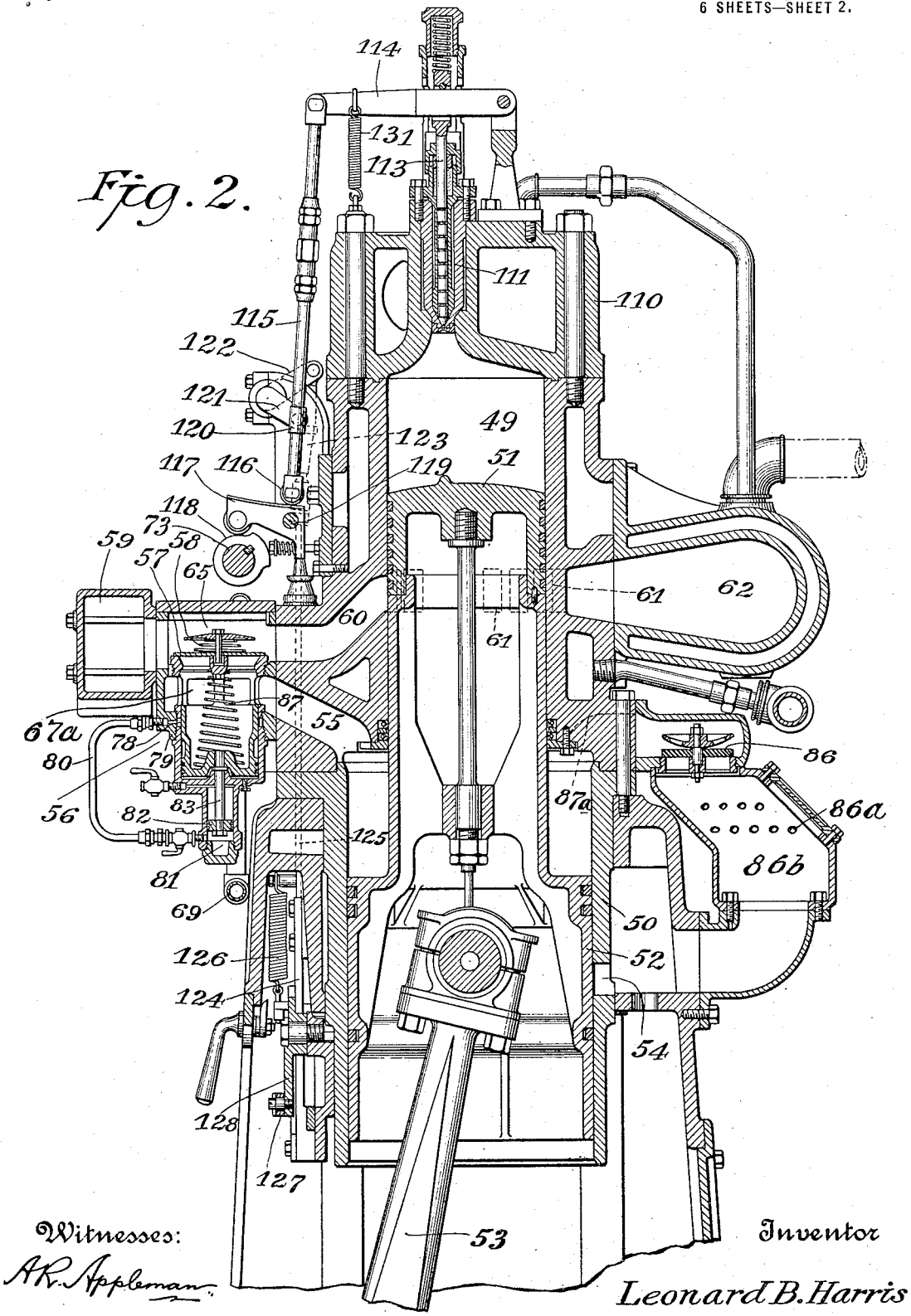

L. B. HARRIS.
LOCOMOTIVE.
APPLICATION FILED OCT. 30, 1914.
1,149,511.
Patented Aug. 10, 1915.
6 SHEETS—SHEET 3.
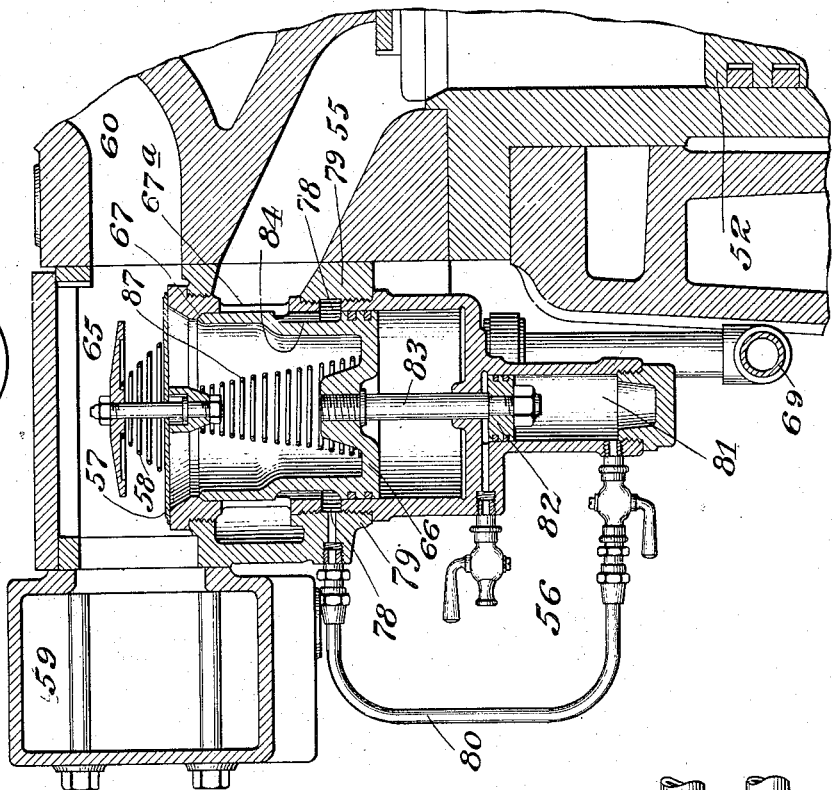
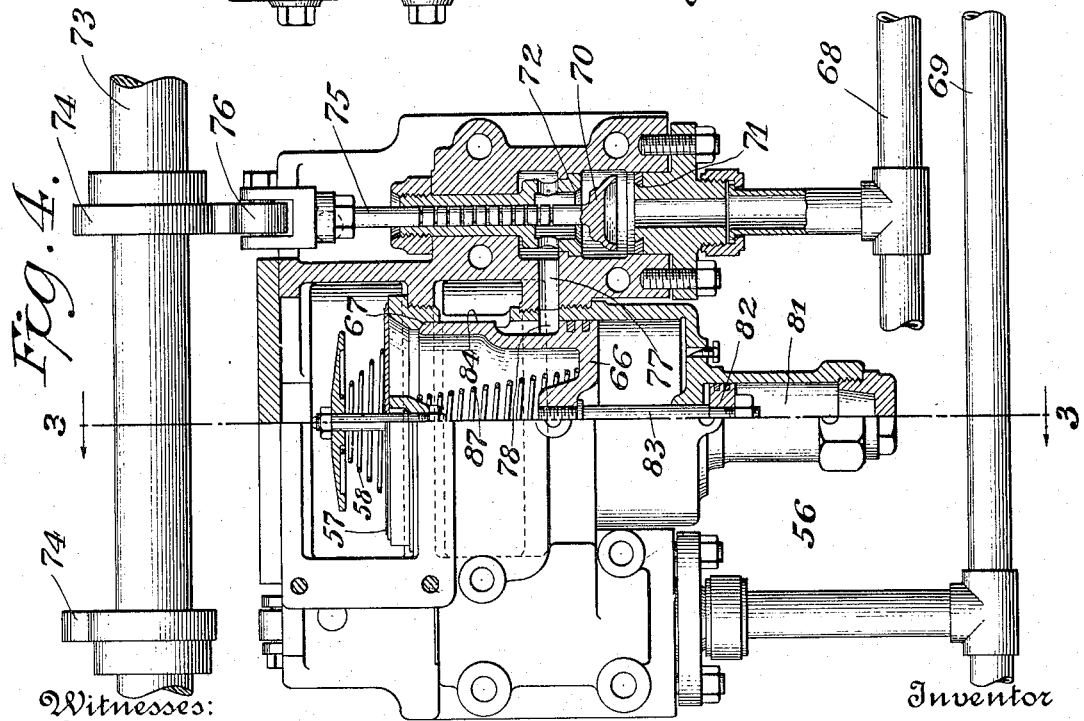
Witnesses:
A. R. Appl_nan
W. A. Hawkins.
Inventor
Leonard B. Harris
By his Attorneys
Meyers, Cushman Rea

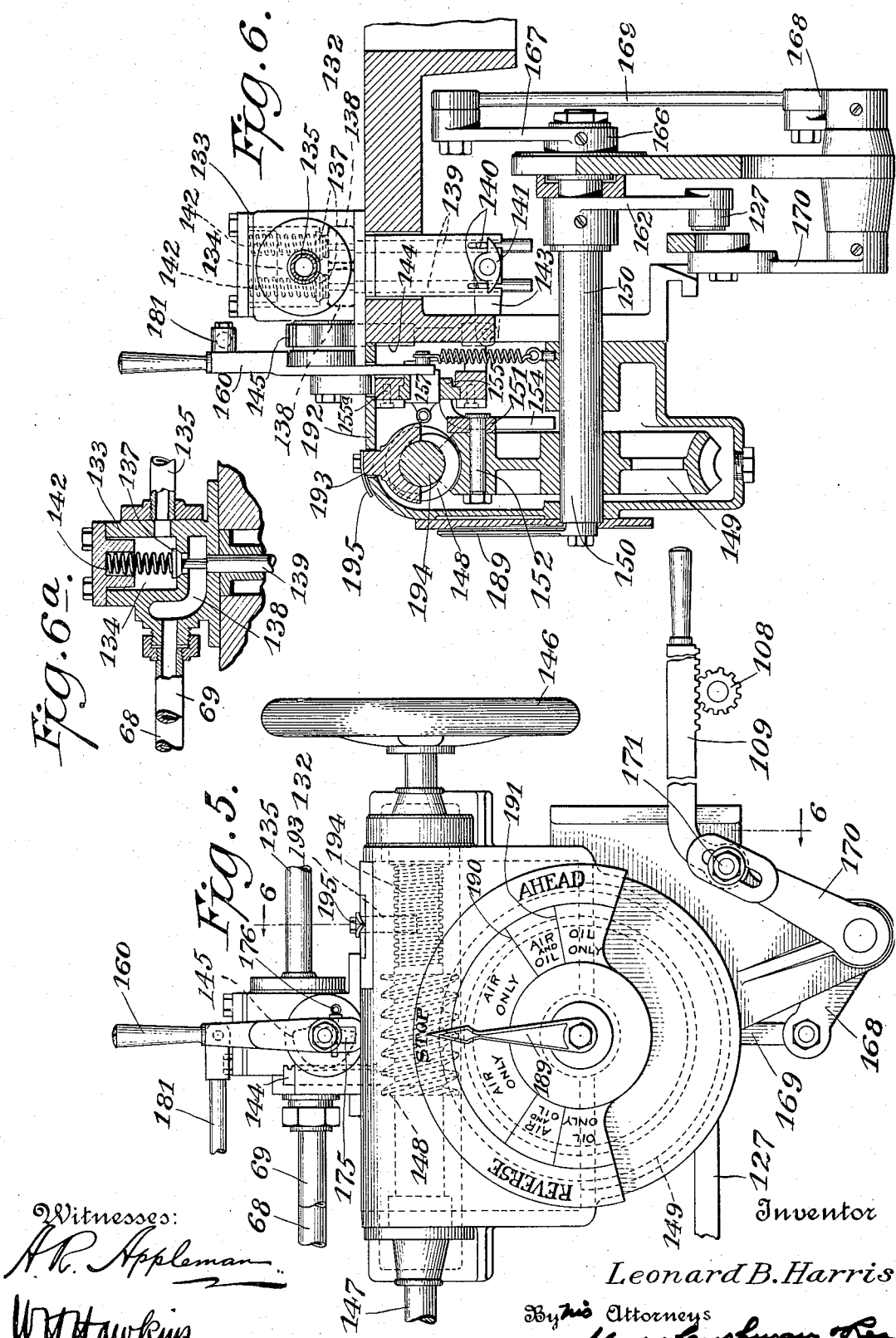

L. B. HARRIS.
LOCOMOTIVE.
APPLICATION FILED OCT. 30, 1914.

1,149,511.

Patented Aug. 10, 1915.
6 SHEETS—SHEET 5.

Witnesses:
H. R. Appleman
W. H. Hawkins

Inventor
Leonard B. Harris
By his Attorney
Meyers, Cushman &Rea

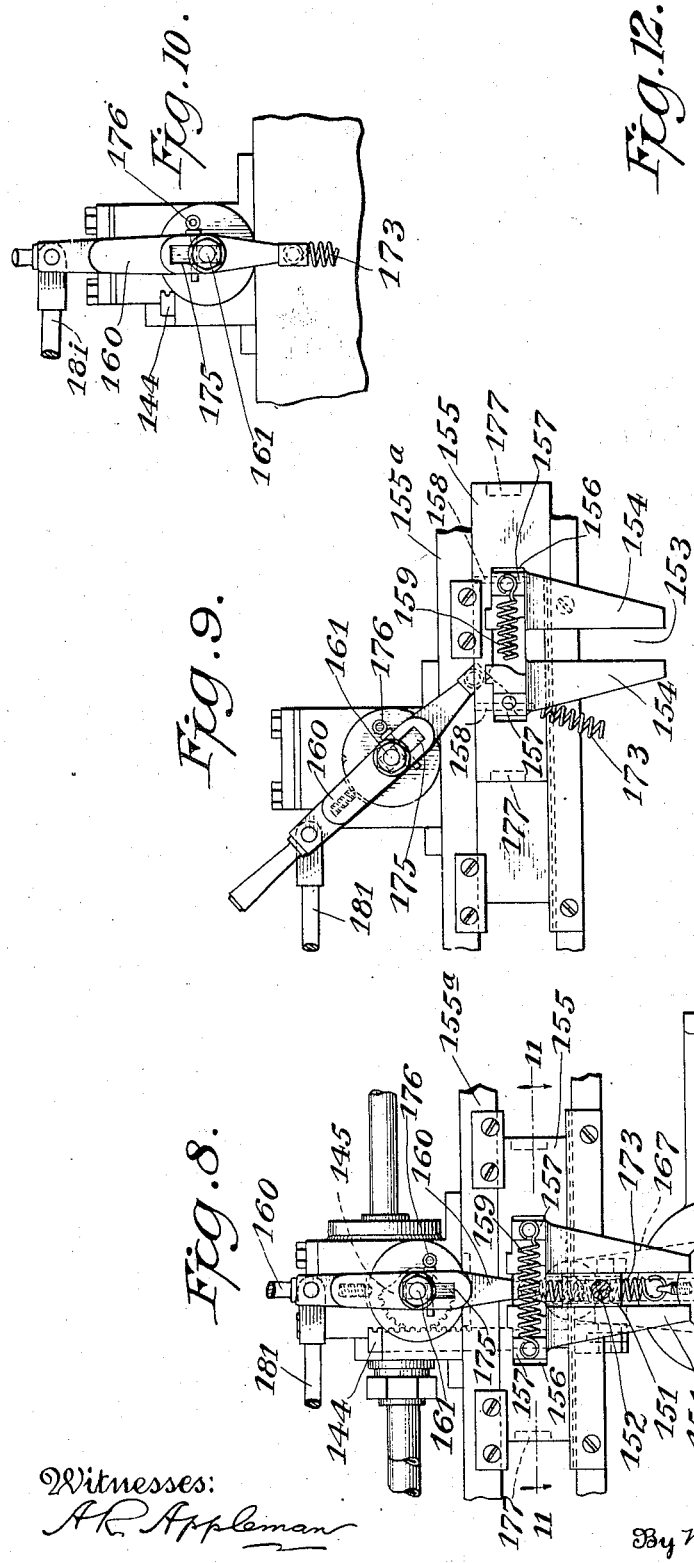

UNITED STATES PATENT OFFICE.

LEONARD B. HARRIS, OF HADDON HEIGHTS, NEW JERSEY, ASSIGNOR TO HARRIS PATENTS COMPANY, OF NEW YORK, N. Y., A CORPORATION OF DELAWARE.

LOCOMOTIVE.

1,149,511.　　Specification of Letters Patent.　Patented Aug. 10, 1915.

Application filed October 30, 1914. Serial No. 869,391.

*To all whom it may concern:*

Be it known that I, LEONARD B. HARRIS, a subject of the King of Great Britain, residing at Haddon Heights, in the county of Camden and State of New Jersey, have invented new and useful Improvements in Locomotives, of which the following is a specification.

This invention relates to locomotives, and a principal object of the invention is to produce a locomotive which can be quickly started and quickly brought to the development of its full tractive power. The engine which furnishes the motive power for the locomotive preferably operates normally on liquid fuel, and one of the objects of the invention is to provide an engine of this type with improved means for enabling the engine to be initially started and driven solely by means of a fluid such as compressed air.

A further object of the invention is to provide an arrangement enabling the engine to be driven when desired, solely by compressed air as an air motor, and at the same time by means of fuel as an internal combustion engine.

A further object of the invention is to provide mechanism for transmitting the driving force to the locomotive wheels which can be controlled so that the locomotive may be driven at different speeds while the engine is running at a substantially constant speed, and operating so as to enable variations to be made in the amount of driving force transmitted from the engine to the driving wheels.

A further object of the invention is to provide an improved arrangement for bringing the weight of the engine over the locomotive driving wheels and for transmitting the driving force from the engine shaft to the locomotive driving wheels.

A further object of the invention is to provide improved means for controlling the operation of the locomotive and also to arrange a control mechanism so that the locomotive can be readily controlled from two points such as from each end of the locomotive.

Further objects of the invention will appear more fully hereinafter.

The invention consists in the general combination of parts and those features, hereinafter described, all of which contribute to produce an efficient locomotive.

The preferred embodiment of my invention will be particularly described in the following specification while the broad scope of my invention will be pointed out in the appended claims.

In the drawings, Figure 1 is a vertical section of a diagrammatic nature illustrating a locomotive embodying my invention, certain parts being broken away and shown in section. Fig. 2 is a vertical section taken through a pair of cylinders of the engine and illustrating parts of the operating mechanism. Fig. 3 is a vertical section on the line 3—3 taken through valve means which constitutes a feature of the invention and which control the operation of the scavenging cylinders in performing their normal scavenging function, or in operating to drive the engine as an air motor. Fig. 4 is a front elevation and partial section of the mechanism partly illustrated in Fig. 3 and particularly illustrating the means for controlling the operation of the valve means. Fig. 5 is a front elevation, certain parts being broken away, of the preferred form of control device embodied in the locomotive illustrated. Fig. 6 is a vertical section through the control device taken partly on the line 6—6 of Fig. 5. Fig. 6ª is a vertical section taken through the valve box or valve chest adjacent to the controller mechanism. Fig. 7 is a view showing a part of the engine in end elevation and particularly illustrating the pump and the control mechanism therefor. Fig. 8 is a front elevation and partial section further illustrating the control mechanism illustrated in Fig. 5. Fig. 9 is a view showing parts of the mechanism illustrated in Fig. 8 and showing certain parts in the position which they assume when the engine operates automatically to cut off the air supply and drive the engine on fuel alone. Fig. 10 is a view showing certain of the parts illustrated in Figs. 8 and 9 and illustrating how the engine is adapted to be operated solely on air independently of the fuel. Fig. 11 is a horizontal section taken about on the line 11—11 of Fig. 8. Fig. 12 is a fragmentary sectional view illustrating a preferred arrangement for controlling the fuel supply. Fig. 13 is a detail and partial section illustrating part of the mechanism for actuating the atomizers.

The engine 20 on the locomotive 21 is preferably an internal combustion engine of the Diesel type arranged over the driving wheels 22 of the locomotive with the engine shaft 23 extending longitudinally of the locomotive, the said shaft being mounted in the lower part of the engine housing 24 to the rear of which a fly wheel 25 is provided; to the rear of the fly wheel 25 a thrust shaft 26 is provided and between this thrust shaft and the fly wheel a friction clutch 27 is provided of any desired form but preferably of the multiple disk type. The rear end of the thrust shaft 26 is carried in a thrust block 28.

I shall now describe the preferred means for transmitting the driving force from the shaft 26 to the driving wheels 22. For this purpose, I prefer to provide a transverse jack shaft 29 over the shaft 26 and drive the jack shaft preferably by means of spiral gears 30 and 31, or other suitable gearing. On the jack shaft 29 I provide a crank arm 32 having a suitable counterweight 33 and this crank arm is connected by a pitman or connecting rod 34 with the crank arm 35 disposed below the engine bed on the cross shaft 36, which shaft 36 is preferably in line with the axles 37 of the driving wheels. The crank arm 35 is preferably similar to the crank arm 32 and similarly provided with a counterweight 38. The crank arms 32 and 35 are preferably arranged in pairs corresponding to the pairs of driving wheels on the opposite sides of the locomotive, and at each side the crank arm 35 is connected with its corresponding driving wheels by a parallel rod or side rod 39.

The preferred means for controlling the transmission through the clutch 27 will now be described. This clutch operates to transmit all of the driving force from the engine to the driving wheel, or it may be operated to drive the locomotive wheels at variable speed while the engine is running at a constant speed; likewise, the amount of force being transmitted through the clutch may be varied. For this purpose I prefer to provide a movable clutch member 40 which is adapted to be moved toward the fixed clutch member 41, the latter of which is on the shaft 26. The clutch member 40 is preferably provided with a collar 42 which slides with the clutch member 40 on the stub shaft 23$^a$ carried by the outer side of the fly wheel. An operating yoke 43 engages the collar 42 for closing the clutch and this yoke 43 has a loose connection with a rod 44 which extends from the piston 45 moving in a suitable cylinder 46. This cylinder 46 is preferably fluid controlled, that is, I prefer to operate the piston 45 by a fluid, such as compressed air. A spring 47 arranged in any suitable manner tends to hold the piston in a position which will hold the clutch open so that no force will be transmitted, but if compressed air is admitted in the cylinder end 48 adjacent the clutch, the force acting on the piston will close the clutch and the degree of pressure between the friction elements of the clutch will depend upon the pressure of the air which is admitted to the cylinder. By admitting the full air pressure, there will be substantially no sliding between the clutch elements and the full power of the engine will be transmitted to the driving wheels. Any less pressure will allow a certain amount of slip in the clutch and this will transmit a proportionally less amount of power enabling the engine to drive the locomotive at low speed. The arrangement for controlling the admission of air to the cylinder 46 will be described hereinafter.

The engine preferably comprises a plurality of cylinders, and the preferred cylinder arrangement consists in arranging the power cylinders which are driven by fuel, in tandem with scavenging cylinders which operate to scavenge the power cylinders. The scavenging cylinders, however, may be operated by compressed air to drive the engine as an air motor. Their preferred arrangement and their operating mechanism is illustrated in Fig. 2 in which each power cylinder 49 is disposed directly over and in tandem with its corresponding scavenging cylinder 50, the power piston 51 and air piston 52 being constructed in tandem and arranged so that each air piston 52 is connected by a connecting rod 53 with the crank shaft 23.

When the engine is running under normal conditions, scavenging air enters at a port 87$^a$ when the air piston 52 is moving down, and during the up-stroke or in-stroke of the piston, this air is forced up through a passage 55 which is controlled by valve means 56. The preferred form of this valve means is described in my copending application Serial No. 726,045. It preferably includes the upper valve 57 which opens upwardly by pressure from beneath, against the force of a spring 58 so that the scavenging air is forced by the piston 52 through the passage 55 up into an air manifold 59 from which the scavenging air passes at the proper times through a passage 60 into the adjacent power cylinder. Opposite each passage 60 there are outlet ports 61 through which the exhaust gases pass into a receiver or manifold 62 which receiver may be connected by a suitable pipe 63, (Fig. 1) with a muffler 64 preferably near the roof of the locomotive. Directly over the manifold 57 an air space 65 is formed which connects the manifold 59 with the passage 60 of the adjacent cylinder.

The valve means 56 is illustrated more in detail in Figs. 3 and 4 and it preferably comprises a movable intercepting valve 66 the upper end of which closes against a seat 67 when the intercepting valve is raised so as to cut off communication between the passage 55 and the air manifold 59. There are two air pipes or conduits 68 and 69 one of which corresponds to the forward direction of running the engine and the other to the reverse direction. On each side of the intercepting valve there is provided a cut off valve 70 which may rest on the lower seat 71 or on the upper seat 72. When air is admitted, in the pipe 68, it forces the valve 70 off its seat 71 and up against the seat 72. The relation of the valve 70 to the seat 72 is controlled by the cam shaft 73 which extends longitudinally of the engine and passes all the cylinders. If the corresponding cam 74 does not prevent the seating of the valve 70 on its seat 72, the stem 75 of the valve will move up so as to hold the roller 76 in a position to be struck by the cam 74 as it rotates.

It should be understood that the intercepting valve 66 at this time is down in its extreme low position as shown in Fig. 2. When the cam 74 comes to the proper position, it will depress the stem 75 and move down the valve 70, so as to permit air to flow past the valve and through the passage 77 into an annular port 78 which passes around the casing 79 of the intercepting valve and remains open even when the valve 66 is down. The air then flows from the port 78 through a duct or pipe 80 down into a pilot cylinder or auxiliary cylinder 81 under the intercepting valve and in which there is a piston 82 connected by a stem 83 with the intercepting valve. The admission of air at this point forces the valve 66 up to its uppermost position and closes the outlet at the seat 67 toward the air manifold. When the intercepting valve 66 is in its uppermost position, its circumferential port 84 permits the air to pass from the annular port 78 into the passage 55, and through this passage 55 compressed air passes into the upper end of the scavenging cylinder so as to exert its pressure on the air piston 52 and drive it down. The cam shaft 73 is driven by a suitable shaft 85 (Fig. 1) from the engine shaft 23. The action of the cams 74 is timed so that compressed air will be admitted to each scavenging cylinder when its piston is at its top or inward center. As soon as the air piston 52 uncovers the port 54, the air exhausts through silencer perforations 86$^a$ in air duct 86$^b$. As the air piston is traveling down, the air in the scavenging cylinder expands but the pressure is maintained high enough to hold the valve 66 up on its upper seat until the port 54 is uncovered. When the starting air exhausts through port 54, the pressure is reduced to substantially atmospheric pressure in the cylinder 50, passages 55, 78, pipe 80 and auxiliary cylinder 81, so that the spring 87 over the valve 66 returns the valve to its extreme low position, as shown in Fig. 2, and then when the air piston moves upwardly, the air which is above it is compressed and passes the valve 57 into the air manifold 59; hence, it is evident that even when the scavenging cylinders are operating to drive the engine as an air motor, they force scavenging air into the air manifold on their return stroke.

In the regular operation of the engine on fuel, free air flows in through perforations 86$^a$ in the duct 86$^b$, and through inlet valve 86 and port 87$^a$. Substantially the same mode of operation occurs when the engine is to be started and driven in the opposite direction on air. In this case, the air would be admitted in the pipe 69 instead of the pipe 68 and the valve 70 would lie on its lower seat 71 and prevent the escape of the air operating the intercepting valves.

Liquid fuel is supplied to the upper ends of the power cylinders through suitable supply pipes such as the pipe 88 (Figs. 1 and 7), and these supply pipes are preferably arranged in pairs corresponding to each pair of power cylinders. The fuel is preferably forced up into the supply pipes 88 from pumping mechanism 90 placed in a suitable case 89 at the forward end of the engine, as illustrated in Fig. 1. This pumping mechanism and the means for controlling it are fully described and illustrated in my co-pending application Serial No. 768,484. The fuel is supplied to a cross pipe 91 from a pipe 92 which connects with the fuel supply, and pump plungers 93 are reciprocated alternately so as to force the fuel in the direction of the arrows indicated in Fig. 7, up into the pipes 88. The pump plungers and their actuating parts are in duplicate and are actuated alternately by eccentrics or cams 94 on a continuously driven cam shaft 95 which is driven in any suitable manner from a moving part of the engine and each cam, as it rotates, strikes against an arm 96 corresponding to each pump rocking on a fulcrum pin 97, and having a substantially horizontal arm 98 which has an oscillating block connection with the lower part of the corresponding pump plunger 93. Arrangement is provided for regulating the position of the fulcrum pins 97, and this evidently will control the amount of stroke of the pumps. For this purpose, the fulcrum pins are mounted on slides 99 which may slide toward or away from each other and each fulcrum pin is provided with a floating double sector 100; the upper teeth 101 of these sectors mesh with worms 102 one right hand and one left hand carried on the shaft 103 which may be connected with a governor, if the engine is provided with a governor. The lower teeth 104 of these floating sectors mesh with worms 105 one right hand and one left hand on the worm shaft 106 which may be adjusted by hand to any position desired, by means of a hand wheel 107. The opposite end of the worm shaft 106 is provided with a pinion 108 which, when the engine is in operation, is rotatable by means of a disengageable rack 109 which is actuated by my control device which will be described hereinafter.

Any number of cams or eccentrics 94 may be placed on the shaft 95 corresponding to the number of levers 114 and pumps 93, and power cylinders 49. There is also a pair of pumps to correspond with every pair of cylinders.

The fuel is preferably admitted to the power cylinders through their heads 110 by means of suitable atomizers 111 the details of which have been fully described in my application Serial No. 769,925. These atomizers are supplied with fuel from the supply pipes 88 and with atomizing air by a suitable supply pipe 112. In the operation of the engine, the atomizer stem 113 corresponding to each cylinder is lifted from its seat so as to spray in the fuel at the proper time, and this is preferably accomplished by means of either of two levers 114 on which the upper end of each stem 113 rides. These levers are actuated by actuating rods 115 one for "go ahead" and one for "reverse", the lower ends of which are provided each with a roller 116 and these rods 115 are arranged to be adjusted in and out on rockers 117, or actuators which are arranged to be actuated continuously by suitable cams 118 on the aforesaid cam shaft 73. The rockers 117 rock on fulcrum pins 119 and when the rods 115 are in the position shown in Fig. 2, the atomizers will have practically no movement whatever. Upon starting the engine one of the rods 115 on each cylinder moves outwardly on its rocker so as to produce more or less lifting movement of the atomizer. For this purpose, the lower end of each rod 115 is mounted to slide in the guide 120 which has a swivel connection with the arm 121, and the position of each arm 121 is controlled by a rigid arm 122 connected by the link 123 with a slide 124 (Fig. 13) by a stem 125 guided in a substantially vertical position near the front of the engine. There is one atomizer corresponding to each power cylinder, and one of the levers 114 corresponds to the forward direction of driving the engine and the other to the reverse direction.

Referring particularly to Figs. 1 and 13, the lower ends of the slides 124 are provided with springs 126 which tend to hold the slides up and with the rods 115 in their inactive position. When my control device is moved to start the engine in one direction, it operates a link 127 which is attached to the lower end of a number of rockers such as the rocker 128, each rocker corresponding to a power cylinder, and each of these rockers has an arm 129 which engages a pin 130 on each slide 124. If the link 127 is moved in one direction, evidently it will pull down one of the slides 124, and leave the other slide elevated. The slide which is pulled down operates its corresponding adjacent arm 121 to move the swivel guide 120 outwardly and hold the actuating rod 115 in a position to be actuated by its rocker 117 at the proper moment. The levers 114 are provided with springs 131 for returning them after the atomizer has been opened.

I shall now describe my control device and the manner in which it controls the operation of the locomotive. Referring particularly to Fig. 1 and Figs. 5 to 12 inclusive, this control device 132 is preferably mounted at the forward end of the locomotive. The details of this device are fully described in a copending application, Serial Number 869,392. I shall first describe the means for controlling the admission of compressed air to the air pipes 68 and 69. The mechanism for this purpose comprises a valve chest or valve box 133 (Fig. 6a) presenting an air chamber 134 into which the air is admitted by a supply pipe 135 from a suitable source of air such as one of the reservoirs 136 at the forward end of the locomotive. In the bottom of this chamber 134, there are two valves which connect respectively with independent air ducts 138. One of these air ducts is connected with the pipe 68 while the other is connected with the pipe 69. In order to open either of these valves 137, the valves are formed each with a stem 139 which extends downwardly and is provided with a laterally projecting dog 140. Between these dogs there is a rocker or actuator 141 having toes under the dogs, and when this rocker is rocked in one direction, evidently one of the valves will be raised, and in the other direction the other valve will be raised; the valves are returned toward their seats by springs 142 and the pressure in the air chamber 134. In order to move the rocker or actuator 141, the same is rigidly connected with an arm 143 and this arm may be actuated in any suitable manner but preferably through the medium of an upwardly extending rack 144 the teeth of which mesh with a rotatable segment 145. This segment 145 may be rotated in any suitable manner by a hand operated member such as the hand wheel 146. I have illustrated a preferred arrangement for moving the segment 145. For this purpose, the shaft 147 of the hand wheel is formed with a worm 148 and this worm rotates a worm wheel 149 rigidly attached to a spindle 150. On the inner face of the worm wheel, a block 151 is loosely attached on the pivot pin 152 and this block slides freely up and down in the slot 153 formed between two horns 154 on the actuator or slide 155. This slide 155 is formed with a longitudinal central slot 156 in which are mounted two dogs 157 mounted to swing on vertical pins 158, the tails of the dogs being connected by a spring 159. Between these dogs there is normally located the lower end of a lever 160 and this lever is connected with the spindle 161 of the segment 145. When the hand wheel 146 is rotated in the proper direction, the actuator 155 will move toward the right and the left hand dog 157 will rotate the lever 160 toward the position in which it is indicated in Fig. 9. Rotating the lever in this direction will evidently admit the compressed air to the pipe 68.

My controller affords means for actuating the aforesaid rockers 128 through the medium of the link 127 so as to throw either of the actuator rods 115 into its active position. For this purpose I prefer to provide the spindle 150 with a downwardly extending arm 162 to which the link 127 is attached (see Fig. 6). This arrangement enables the hand wheel 146 to actuate the means for admitting the fuel or for controlling the fuel supply at the same time that it is controlling the admission of compressed air. In order to prevent the atomizers from being thrown into active operation at once, when the compressed air is turned into the engine to drive it as an air motor, I prefer to employ a lost motion device such as that illustrated in Fig. 12, which consists substantially in providing the hub of the lever 162 with a bushing 163 having a circumferential slot 164 and provide the spindle 150 with a fixed key 165. When the hand wheel is in the neutral position, the key 165 is in mid-position in the slot. When the hand wheel is moved from its neutral position, it begins at once to admit compressed air but the atomizers do not become active until the key 165 strikes the end of the slot 164 and commences to move the arm 162. I may also, if desired, control the pumps through the medium of a similar lost motion device which is formed in the hub 166 of an upwardly extending arm 167 (see Fig. 6). This arm 167 is in a vertical position when the hand wheel 146 is in its neutral position so that when the arm 167 moves from this position, it depresses an arm 168 through the medium of a connecting link 169 and this arm 168 is connected rigidly with an arm 170. This arm 170 is connected by an adjustable pin and slot connection 171 with the aforesaid rack 109. This rack 109 is also in connection with the pumping mechanism and, as indicated in Fig. 5, it rests on the upper side of the pinion 108 which controls the adjacent worms 105; as soon as the worms 105 begin to move, the cams 94 commence to operate the pumps and supply fuel to the atomizers.

Although it is not necessary in starting the engine, I prefer to provide a cam 172, (Fig. 7) operated by a hand crank 173 for driving the pump plungers by hand when desired.

Referring again to Fig. 9, it will be evident that when the movement of the slide 155 in either direction (for instance toward the right) is sufficient, the dog 157 will pass under the lower end of the lever 160 and the lever will become released and will then be brought back to its vertical or neutral position by a spring 173. When the slide or actuator 155 returns to its central or neutral position sliding in its guide 155ª, the inclined back face 174 of the dog 157 will strike the edge of the lever 160 and the dog will yield and spring outwardly so as to let the lever come into position again between the dogs.

In order to enable the lever 160 to be operable independently of the hand wheel 146, the lever 160 is provided with a slot 175 and this slot fits over a flat sided neck on the spindle 161; a removable pin 176 normally holds the spindle in the upper end of the slot 175, but if this pin is removed, the lever can be pulled up into the position indicated in Fig. 10, and the pin then should be replaced above the neck. This slightly extends the spring 173, but evidently the spring will operate as before to return the lever to its neutral position if let go. If desired, the lever 160 may be provided with any finger controlled latch for holding it in any position desired. When the lever is pinned in this elevated position, its lower end swings clear of the dogs 157 so that the lever is freely movable enabling the air to be controlled independently of the hand wheel 146.

When the lever 160 becomes released from the actuator 155, it swings to its neutral position and automatically cuts off the supply of compressed air to the engine, and as it comes to its neutral position its further movement is arrested by either of two buffers 177 located at the ends of the slide, preferably as shown in Figs. 9 and 11. But it is still possible to move the lever 160 to the left admitting air in the direction that the engine would then be running if so desired, to augment the power developed by the power cylinders, by admitting air to the scavenging cylinders at the same time.

I prefer to provide an arrangement enabling the controller mechanism to be operated from either end of the locomotive, (Figs. 1 and 5). This is preferably accomplished by extending the shaft 147 to the other end of the locomotive where it is supported in a suitable pedestal bearing 178, and beyond the bearing 178 a hand wheel 179 is provided similar to the hand wheel 146. It is understood however, that the bearing 178 is a simple bearing and there is no duplication whatever of any of the inner mechanism of the controller at this point. I also provide an air controlling member or lever 180 which is pivotally mounted on the bearing 178 and which is connected by a long link 181 with the lever 160.

I shall now describe the preferred arrangement for controlling the fluid operated cylinder 46. For this purpose I provide controlling valves 182 at each end of the locomotive. These valves are preferably two-way cocks supplied with compressed air respectively by pipes 183 and 184. When either of these valves is in the proper position, it will admit compressed air to the connecting pipe 185 which pipe has a connection 186 to the air-end 48 of the cylinder 46. When the lever 187 of either of these valves is in another position, the pipe 185 will be connected with one of the exhaust pipes 188, so the air may flow out of the cylinder. With this arrangement, evidently the air may be turned into the cylinder 46 from either end of the locomotive; and furthermore, the amount of air let into the cylinder will determine the amount of force exerted upon the piston 45 and this will control the pressure exerted between the friction elements of the clutch. In this way, I can graduate the amount of power transmitted from the engine to the driving wheels and I can, at a moment's notice, discontinue the power transmission; but evidently, if the full force of air is on, the full driving force of the engine will be imparted to the driving wheels.

Referring again to the controller mechanism and particularly to Fig. 5, the spindle 150 is provided with a pointer or needle 189 the vertical position of which corresponds to the neutral or stop position of the controlling mechanism and the hand wheel 146. If the indicator or pointer 189 moves toward the right, the engine will be driven ahead on air only until the pointer arrives at the mark 190. Between the marks 190 and 191, the engine will operate on compressed air and on fuel simultaneously, that is on compressed air admitted to the scavenging cylinders and driving the engine as an air motor while the power cylinders are operating on fuel. It should be understood that before the pointer arrives at the line 190, the atomizers and the pumps will begin to operate. That is, the pumps and the atomizer mechanism are adjusted and arranged so as to commence to operate at this point. When the pointer 189 is about at the line 191, the air controlling member or lever 160 will operate to cut off the air supply to the scavenging cylinders, and after this point, the engine will be driven solely by fuel admitted to the power cylinders.

In order to indicate the direction of movement of the pointer 189, at the upper side of the case 192, I prefer to provide a nut 193 which rides as a saddle on the screw 194 formed on the shaft 147. This nut carries a pointer 195 which is normally in the neutral position indicated in Fig. 5, but which moves from this neutral position in the same direction that the pointer moves.

I shall now particularly describe the general mode of operation of the locomotive. A rotation of the hand wheel 146 operates the mechanism which admits compressed air to either of the pipes 68 or 69. In the present embodiment of the invention, the motion of the hand wheel is imparted to the lever 160 which operates through segment 145 and rack 144 to move the rocker cam or actuator 141, and one of the toes of this cam will push up the stem 139 of the throttle valve 133 and open the valve, so that air will flow from the pipe 135 and corresponding duct 138 into either of the pipes 68 or 69. Referring now to Fig. 4, and assuming that the air is admitted in the pipe 68, the valve 70 will move up against its seat 72. Some one of these valves 70 will be prevented by its cam from coming against its upper seat 72, and this will permit air to flow in past the valve and through the port 77 and through the annular port 78 into the pilot cylinder 81, and the air pressure in this cylinder 81 will force up the intercepting valve 66 to its uppermost position and close off communication from the passage 55 to the air space 65 immediately over the intercepting valve. When the intercepting valve moves up to this position, communication is opened up from the annular port 78, and the annular port 84 in the intercepting valve so that air is admitted through the openings 67ª of the valve casing; the compressed air will then flow into the passage 55 and drive the piston 52 downwardly. When the rotation of the engine is once started, as each cam 74 rotates, at the proper point it will open its corresponding cut off valve 70 and admit air to its corresponding cylinder at the proper time. As soon as the cam passes out of the way of the roller 76, the valve 70 is immediately closed by an upward movement due to the air pressure, and re-seats on the seat 72 so as to cut off the flow of air. The air then expands in the cylinder and the pressure during the expansion holds up the intercepting valve 66 until the piston 52 uncovers the port 54. On the upstroke of the scavenging piston, the intercepting valve 66 is in its extreme low position, as shown in Fig. 2, to which it is returned by the spring 87 which allows the scavenging air to pass up through the passage 55 upon and past valve 57 and go into the air manifold 59. If the movement of the hand wheel 146 is not sufficient to carry the pointer 189 beyond the line 190, the engine will continue to run on the scavenging cylinders operating as an air motor. If a sufficient amount of pressure is used for the compressed air, the locomotive may be operated in this way to shift it about the railroad yard or to shift cars about the yard. If the movement of the hand wheel 146 is continued so that the pointer 189 passes beyond the line 190, then the atomizers and pumps will begin to operate through their connections, illustrated in Figs. 5 to 8 inclusive. At about the line 191, as explained above, the automatic cut off of the air occurs and the engine will thereafter be driven solely on fuel in the power cylinders.

It is understood that a separate manifold connects each pair of cylinders. It is also understood that there is a pair of the levers 114 for each power cylinder, one lever for "go ahead" and one for "reverse." Each lever is actuated by a separate cam 118. The cams 118 are arranged in relative position to the cranks of the engine so that one will admit air at the correct time to turn the engine over "ahead" and the other in such a position that it will admit air at the right time to turn the engine over in "reverse" direction.

While the engine is running on oil, the scavenging cylinders perform their normal function of scavenging the power cylinders by forcing air through into the air manifold 59. As each power piston 51 passes below the port 60, the scavenging air passes through the cylinder and carries off the exhaust gases leaving sufficiently pure air in the cylinder for the next compression stroke to insure proper combustion of the fuel charge which is sprayed in by the atomizer.

The scavenging cylinders may be made to compress air and thus do useful work at the same time producing a braking effect on the locomotive. The locomotive may be operated so as to recharge the air starting bottles from the scavenging cylinders as follows: Assuming that the atomizers are thrown out of action and the fuel pumps are put out of operation in the same way that they would be in bringing the engine to rest. It would be understood then, that if the locomotive continues to run, as is commonly called "coasting," the momentum of the train driving the engine shaft around would cause the pistons to continue their inward and outward strokes. Under these conditions, if the starting air were admitted to the scavenging cylinders by the hand controlled lever 160, in such a way that the air would endeavor to drive the engine in the opposite direction to which the momentum is driving it, the effect would be that the momentum of the locomotive would drive the scavenging pistons inward against this air pressure. It being understood, of course, that the point of cut off, as controlled by the cam, would become the point of admission, and the usual point of admission would become the cut off, owing to the "reverse" cams admitting the air while the engine is being driven ahead. This causes the starting air after acting against the scavenging piston to be forced back again into the starting air reservoir with the addition of a cylinder full of free air, which would have been drawn into the scavenging cylinder before the starting air was admitted. This would have the effect of pumping up the starting air bottles, at the same time having a braking effect on the momentum of the locomotive.

It is understood that the embodiment of the invention described herein is only one of the many embodiments my invention may take, and I do not wish to be limited in the practice of the invention nor in my claims to the particular embodiment set forth.

What I claim is:—

1. A locomotive comprising in combination, an internal combustion engine having power cylinders and scavenging cylinders arranged in tandem therewith for scavenging said power cylinders, a source of compressed air, means for controlling the admission of compressed air from said source to said scavenging cylinders to initially start and drive the locomotive solely by compressed air from said source, means for supplying fuel to the power cylinders, means for controlling the same, driving wheels and means for driving the said driving wheels from said engine.

2. A locomotive comprising in combination, an internal combustion engine having power cylinders and scavenging cylinders arranged in tandem therewith for scavenging said power cylinders, a source of compressed air, means for controlling the admission of compressed air from said source to said scavenging cylinders to initially start and drive the locomotive solely by compressed air from said source, means for supplying fuel to the power cylinders, means for controlling the same, a hand operated member for simultaneously actuating said air controlling means and the said fuel controlling means, driving wheels and means for driving the said driving wheels from said engine.

3. A locomotive comprising in combination, an internal combustion engine having power cylinders and scavenging cylinders arranged in tandem therewith for scavenging said power cylinders, a source of compressed air, means for controlling the admission of compressed air from said source to said scavenging cylinders to initially start and drive the locomotive solely by compressed air from said source, means for supplying fuel to the power cylinders, means for controlling the same, driving wheels and means for driving the said driving wheels from said engine, said air controlling means being arranged to operate to admit the air and drive the engine also on air after the engine is running on fuel.

4. A locomotive comprising in combination, an internal combustion engine having power cylinders and scavenging cylinders arranged in tandem therewith for scavenging said power cylinders, a source of compressed air, means for controlling the admission of compressed air from said source to said scavenging cylinders to initially start and drive the locomotive solely by compressed air from said source, means for supplying fuel to the power cylinders, means for controlling the same, a hand operated member for simultaneously actuating said air controlling means and the said fuel controlling means, driving wheels, means for driving the said driving wheels from said engine, and a lost-motion connection for operating said fuel controlling means to admit fuel and drive the engine on fuel in its power cylinders after the engine has been running on compressed air in its scavenging cylinders.

5. A locomotive comprising in combination, an internal combustion engine having power cylinders and scavenging cylinders arranged in tandem therewith for scavenging said power cylinders, a source of compressed air, means for controlling the admission of compressed air from said source to said scavenging cylinders to initially start and drive the locomotive solely by compresed air from said source, means for supplying fuel to the power cylinders, means for controlling the same, a hand operated member for simultaneously actuating said air controlling means and the said fuel controlling means, driving wheels and means for driving the said driving wheels from said engine, said air controlling means being arranged to cut off the air supply before a complete movement of said hand operated member to drive the engine finally on fuel alone.

6. A locomotive comprising in combination, an internal combustion engine having power cylinders and scavenging cylinders arranged in tandem therewith for scavenging said power cylinders, a source of compressed air, means for controlling the admission of compressed air from said source to said scavenging cylinders to initially start and drive the locomotive solely by compressed air from said source, means for supplying fuel to the power cylinders, means for controlling the same, driving wheels and means for driving the said driving wheels from said engine, a fly wheel on said engine shaft, and a clutch between said engine shaft and the driving wheels.

7. A locomotive comprising in combination, an internal combustion engine having power cylinders and scavenging cylinders arranged in tandem therewith for scavenging said power cylinders, a source of compressed air, means for controlling the admission of compressed air from said source to said scavenging cylinders to initially start and drive the locomotive solely by compressed air from said source, means for supplying the fuel to the power cylinders, means for controlling the same, driving wheels and means for driving the said driving wheels from said engine, a fly wheel on said engine shaft, a clutch between said engine shaft and the driving wheels, and fluid actuated means for controlling said clutch.

8. A locomotive comprising in combination; an internal combustion engine having power cylinders and scavenging cylinders arranged in tandem therewith for scavenging said power cylinders, a source of compressed air, means for controlling the admission of compressed air from said source to said scavenging cylinders to initially start and drive the locomotive solely by compressed air from said source, means for supplying fuel to the power cylinders, means for controlling the same, a hand operated member for simultaneously actuating said air controlling means and the said fuel controlling means, driving wheels means for driving the said driving wheels from said engine, and an independently operable part for controlling the admission of compressed air to the scavenging cylinders to drive the locomotive solely by compressed air.

9. A locomotive comprising in combination, an internal combustion engine having power cylinders and scavenging cylinders arranged in tandem therewith for scavenging said power cylinders, a source of compressed air, means for controlling the admission of compressed air from said source to said scavenging cylinders to initially start and drive the locomotive solely by compressed air from said source, means for supplying the fuel to the power cylinders, means for controlling the same, driving wheels means for driving the said driving wheels from said engine, a fly wheel on said engine shaft, a clutch between said engine shaft and the driving wheels, fluid actuated means for controlling said clutch, said fluid actuated means including a cylinder, and means for admitting compressed air to said cylinder from each end of the locomotive.

10. A locomotive comprising, in combination, a plurality of internal combustion power cylinders and pistons, and a plurality of scavenging cylinders and pistons arranged in tandem therewith for scavenging said power cylinders, said scavenging cylinders having passages for connecting each scavenging cylinder with its adjacent power cylinder, valve means for controlling said passages, driving wheels connected with said pistons to be driven thereby, a source of compressed air, means for controlling the admission of compressed air to the said valve means to drive the locomotive solely by compressed air from said source, and means for controlling said valve means to close said passages and produce a braking effect on the locomotive by compressing air in the said scavenging cylinders and forcing the same back to said source.

11. A locomotive comprising in combination, an internal combustion engine having power cylinders and scavenging cylinders arranged in tandem therewith, power pistons in said power cylinders, and tandem air pistons in said scavenging cylinders, means for scavenging each power cylinder with air compressed by the air piston of the adjacent scavenging cylinder on the instroke thereof, a source of compressed air, means for controlling the admission of compressed air from said source to said scavenging cylinders on the out-stroke of the pistons to operate the air pistons to start or reverse the locomotive solely by compressed air from said source, an engine shaft driven by said pistons, driving wheels, and a clutch for driving the said driving wheels from said engine shaft.

12. A locomotive comprising in combination, an internal combustion engine having power cylinders and scavenging cylinders arranged in tandem therewith, power pistons in said power cylinders, and tandem air pistons in said scavenging cylinders, means for scavenging each power cylinder with air compressed by said air pistons on the instroke thereof, a source of compressed air, means for controlling the admission of compressed air from said source to said scavenging cylinders on the outstroke of the pistons to operate the air pistons to start the locomotive solely by compressed air from said source, an engine shaft driven by said pistons, driving wheels, a friction clutch between said engine shaft and said driving wheels for driving the latter, pneumatic means for varying the frictional force in said clutch, and means for supplying the same with air from said source.

13. A locomotive comprising, in combination, a plurality of internal combustion power cylinders and scavenging cylinders therefor, pistons for said cylinders, driving wheels driven by said pistons, an air reservoir for compressed air carried by the locomotive, controller mechanism, means actuated thereby for admitting fuel to said power cylinders, said controller mechanism including a hand operated member, means actuated by said hand operated member for controlling the admission of compressed air from said reservoir to said scavenging cylinders for driving the engine as an air motor, said member being movable in one direction to control the locomotive and drive it in one direction, and movable in the other direction to control the locomotive and drive it in the other direction solely by compressed air, the said controller mechanism including an independently operable part also for controlling the admission of air to said scavenging cylinder for driving the engine solely as an air motor.

14. A locomotive comprising, in combination, an internal combustion engine having power cylinders and scavenging cylinders arranged in tandem therewith, a shaft driven from said cylinders and extending longitudinally of the locomotive, driving wheels for the locomotive disposed beneath the engine and inclined connecting means driven by said engine shaft and connected with said driving wheels to drive the same.

15. A locomotive comprising, in combination, an internal combustion engine having power cylinders and scavenging cylinders arranged in tandem therewith, a shaft driven from said cylinders and extending longitudinally of the locomotive, driving wheels for the locomotive disposed beneath the engine, inclined connecting rods, spiral gears for driving the same by said engine shaft, and means connecting said rods with said driving wheels to drive the same.

16. A locomotive comprising, in combination, a reversible internal combustion engine of the Diesel type having power cylinders and scavenging cylinders arranged in tandem therewith for scavenging said power cylinders, pistons for said cylinders, a shaft driven thereby a source of compressed air, means for controlling the admission of compressed air from said source to said scavenging cylinders to initially start and drive the locomotive solely by compressed air in a forward direction and in a reversed direction, means for supplying fuel to the power cylinders, means for controlling the same, a hand operated member movable in one direction for driving the engine in one direction and movable in the other direction to drive the engine in a reverse direction, driving wheels for the locomotive and means for driving the locomotive wheels from said shaft.

17. A locomotive comprising in combination, an internal combustion engine having a plurality of power cylinders and pistons and scavenging cylinders and pistons arranged in tandem therewith for scavenging said power cylinders, driving wheels driven by said pistons, said scavenging cylinders having passages for connecting each scavenging cylinder with its adjacent power cylinder, a valve at said passages for controlling the same, a source of compressed air carried by the locomotive, means for admitting free air to each scavenging cylinder to be compressed by the scavenging pistons on their instroke, means for controlling the admission of compressed air through said valve means to said scavenging cylinders to drive the locomotive solely by compressed air from said source, and for controlling said valve means to admit compressed air from said source to the scavenging cylinders on the instroke of their pistons to exert a braking effect when the locomotive is running solely by momentum, said last means including valves permitting a return movement of air toward said source, said scavenging pistons operating to force back toward said source, said compresesd air and said free air, whereby said source of compressed air is replenished with compressed air.

18. A locomotive comprising in combination, an internal combustion engine having power cylinders and scavenging cylinders therefor, pistons for said cylinders, driving wheels driven by said pistons, an air reservoir for compressed air, controller mechanism at one end of said locomotive, means actuated thereby for admitting fuel to said power cylinders, said controller mechanism including a hand operated member, means actuated by said hand operated member for controlling the admission of compressed air to said scavenging cylinders for driving the engine as an air motor, said member being movable in one direction to control the locomotive and drive it in one direction solely by compressed air, and movable in the other direction to control the locomotive and drive it in the other direction solely by compressed air, an independently operable part also for controlling the admission of air to said scavenging cylinders for driving the engine solely as an air motor, and means for operating said independently operable part from the end of the locomotive remote from said controller mechanism.

In testimony whereof I have hereunto set my hand in presence of two subscribing witnesses.

LEONARD B. HARRIS.

Witnesses:
GEORGE MARK,
F. D. AMMEN.